(12) United States Patent
Ma et al.

(10) Patent No.: US 9,122,586 B2
(45) Date of Patent: Sep. 1, 2015

(54) PHYSICAL-TO-LOGICAL ADDRESS MAP TO SPEED UP A RECYCLE OPERATION IN A SOLID STATE DRIVE

(71) Applicant: Seagate Technology, Cupertino, CA (US)

(72) Inventors: Li Zhao Ma, Shanghai (CN); Zhi Min Dong, Shanghai (CN); Rong Yuan, Shanghai (CN); Ning Wang, Shanghai (CN); Xing Rong, Shanghai (CN)

(73) Assignee: Seagate Technology LLC, Cupertino, CA (US)

( * ) Notice: Subject to any disclaimer, the term of this patent is extended or adjusted under 35 U.S.C. 154(b) by 212 days.

(21) Appl. No.: 13/780,229

(22) Filed: Feb. 28, 2013

(65) Prior Publication Data

US 2014/0223075 A1    Aug. 7, 2014

(30) Foreign Application Priority Data

Feb. 6, 2013    (CN) .......................... 2013 1 0050270

(51) Int. Cl.
*G06F 12/00* (2006.01)
*G06F 12/02* (2006.01)

(52) U.S. Cl.
CPC .... *G06F 12/0246* (2013.01); *G06F 2212/7201* (2013.01); *G06F 2212/7202* (2013.01); *G06F 2212/7205* (2013.01); *G06F 2212/7207* (2013.01); *G06F 2212/7209* (2013.01)

(58) Field of Classification Search
None
See application file for complete search history.

(56) References Cited

U.S. PATENT DOCUMENTS

| | | | |
|---|---|---|---|
| 8,225,050 B2 | 7/2012 | Chang et al. | 711/154 |
| 2010/0070735 A1* | 3/2010 | Chen et al. | 711/206 |
| 2010/0088482 A1 | 4/2010 | Hinz | 711/166 |
| 2011/0225346 A1 | 9/2011 | Goss et al. | 711/103 |
| 2011/0231623 A1 | 9/2011 | Goss et al. | 711/159 |
| 2012/0072639 A1 | 3/2012 | Goss et al. | 711/103 |
| 2012/0072654 A1 | 3/2012 | Olbrich et al. | 711/103 |
| 2012/0203958 A1 | 8/2012 | Jones et al. | 711/103 |
| 2012/0239889 A1 | 9/2012 | Lee et al. | 711/154 |
| 2012/0284587 A1 | 11/2012 | Yu et al. | 714/773 |
| 2012/0311000 A1 | 12/2012 | Post et al. | 707/824 |
| 2012/0311232 A1 | 12/2012 | Porterfield | 711/103 |

* cited by examiner

*Primary Examiner* — Shawn X Gu
(74) *Attorney, Agent, or Firm* — Christopher P. Maiorana, PC

(57) ABSTRACT

A method for increasing performance of a recycle operation in a solid state drive, comprising the steps of (A) creating an empty physical-to-logical address map in a memory having a plurality of entry locations, (B) filling one of the plurality of entry locations with a physical page address associated with each data write operation to a block, where the block has a plurality of pages, (C) writing the physical-to-logical address map to a last of the plurality of pages during a write to a second to last page of the block and (D) initiating a recycle operation of the block by reading the address map to determine whether the pages contain valid data.

20 Claims, 6 Drawing Sheets

US 9,122,586 B2

PHYSICAL-TO-LOGICAL ADDRESS MAP TO SPEED UP A RECYCLE OPERATION IN A SOLID STATE DRIVE

FIELD OF THE INVENTION

The present invention relates to memory devices generally and, more particularly, to a method and/or apparatus for implementing a physical-to-logical address map to speed up a recycle operation in a solid state drive.

BACKGROUND OF THE INVENTION

A conventional solid state drive (SSD) operates differently than a hard disk drive (HDD). In a HDD, each logical block address (LBA) that a host wants to write has a fixed physical address space for the write operation. In an SSD, there is not an LBA limitation. In a conventional NAND flash, data is written in pages. If one page has been written with data, a new data needs to be written to the page. An erase operation needs to be performed on the block containing the page. After the erase, new data can be written on the page. If the data in some of the pages of the block is no longer needed (also called stale pages), only the pages with valid data in that block are read and re-written into another previously erased empty block. Then the free pages left by not moving the stale data are available for new data. This is called Garbage collection. In a conventional system, Garbage collection needs to be searched from all of the pages of one block, which is time consuming.

It would be desirable to implement a physical-to-logical address map to speed up a recycle operation in SSD.

SUMMARY OF THE INVENTION

The present invention concerns a method for increasing performance of a recycle operation in a solid state drive, comprising the steps of (A) creating an empty physical-to-logical address map in a memory having a plurality of entry locations, (B) filling one of the plurality of entry locations with a physical page address associated with each data write operation to a block, where the block has a plurality of pages, (C) writing the physical-to-logical address map to a last of the plurality of pages during a write to a second to last page of the block and (D) initiating a recycle operation of the block by reading the address map to determine whether the pages contain valid data.

The features and advantages of the present invention include providing physical-to-logical address map that may (i) speed up recycle in an SSD, (ii) determine whether a mapped block contains garbage data, and/or (iii) be easy to implement.

BRIEF DESCRIPTION OF THE DRAWINGS

These and other features and advantages of the present invention will be apparent from the following detailed description and the appended claims and drawings in which:

DETAILED DESCRIPTION OF THE PREFERRED EMBODIMENTS

An embodiment of the invention concerns a method to map physical-to-logical addresses to speed up recycle operations in a solid state drive (SSD). The physical-to-logical address comprises a table of data that writes to a NAND flash portion of the SSD. In one example, when the SSD starts a recycle operation, the firmware in the SSD will first read the map to an internal RAM, then decide which block needs to be recycled. By using physical-to-logical map, the SSD firmware accomplishes a recycle operation while only reading a few pages of the NAND flash.

Figure 1:
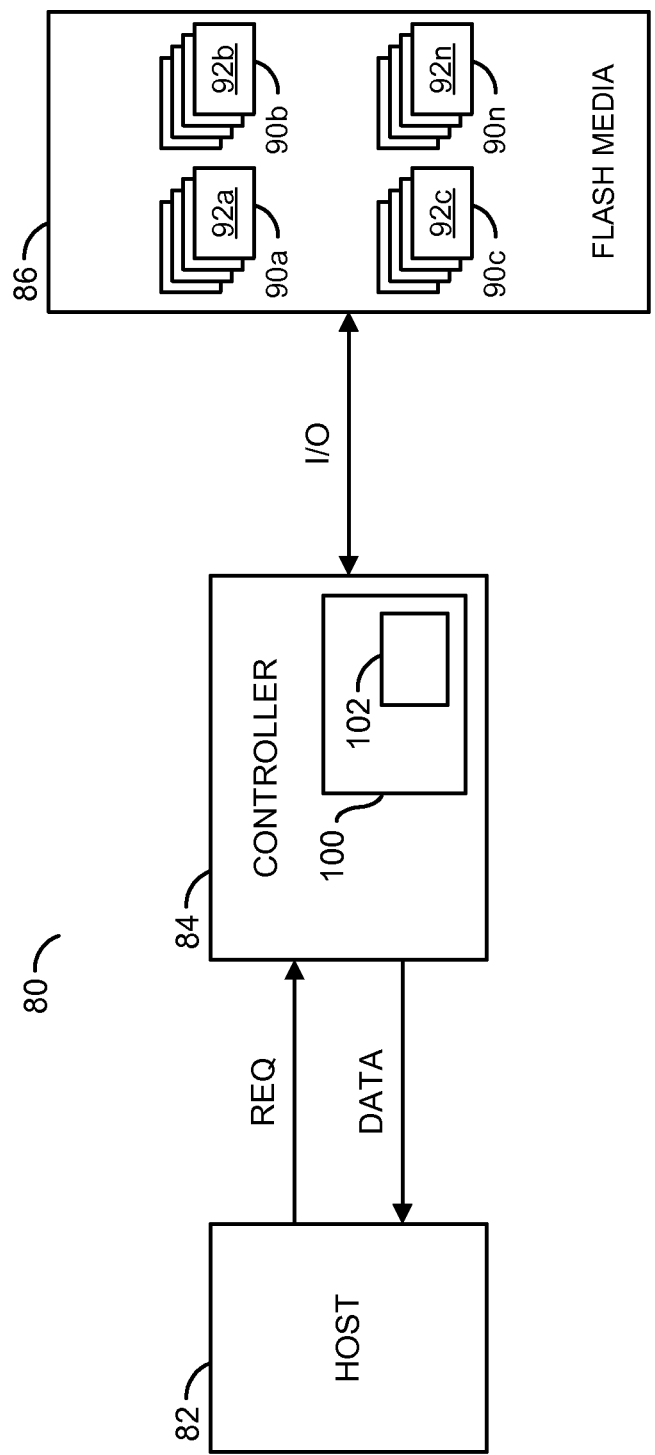
FIG. 1 is a block diagram of an embodiment of the invention.

Referring to FIG. 1, a block diagram of an apparatus 80 illustrating an embodiment of the invention is shown. In one example, the apparatus 80 may be implemented as a device, such as a mobile computing device, having a nonvolatile memory circuit. However, other types of devices may be implemented to meet the design criteria of a particular implementation. The apparatus 80 generally comprises a block (or circuit) 82, a block (or circuit) 84 and a block (or circuit) 86. The circuit 84 may include a block (or circuit) 100. The block 84 is shown as a controller. The block 100 may be implemented as a memory. The memory 100 may store firmware 102, or other software, used to control the circuit 84. The firmware 102 may operate the controller 84 and include the recycle operations described. The memory 100 may hold the physical-to-logical map.

A signal (e.g., REQ) may be generated by the circuit 82. The signal REQ may be received by the circuit 84. The signal REQ may be a request signal that may be used to access data from the circuit 86. A signal (e.g., I/O) may be generated by the circuit 84 to be presented to the circuit 86. The signal REQ may include one or more address bits. A signal (e.g., DATA) may be one or more data portions received by the circuit 82.

The circuit 82 is shown implemented as a host circuit. The circuit 82 reads and writes data to and from the circuit 86. The circuit 86 is generally implemented as a nonvolatile memory circuit such as a NAND flash. However, other types of memory may be implemented to meet the design criteria of a particular implementation. The circuit 86 may include a number of modules 90a-90n. The modules 90a-90n may be implemented as NAND flash chips. In some embodiments, the circuit 86 may be a NAND flash device. In other embodiments, the circuit 84 and/or the circuit 86 may be implemented as all or a portion of a solid state drive having one or more nonvolatile devices. The circuit 86 is generally operational to store data in a nonvolatile condition. When data is read from the circuit 86, the circuit 82 may access a set of data (e.g., multiple bits) identified in the signal REQ. In one example, modules 90a-90n may be prefabricated modules hardwired to a printed circuit board (PCB). In another example, the modules 90a-90n may be removable modules that may be used to increase or decrease the total size of the circuit 86. In one embodiment, the circuit 86 may include both removable and/or non-removable modules 90a-90n. Additionally, each of the modules 90a-90n may include a number of individual memory elements 92a-92n.

Figure 2:
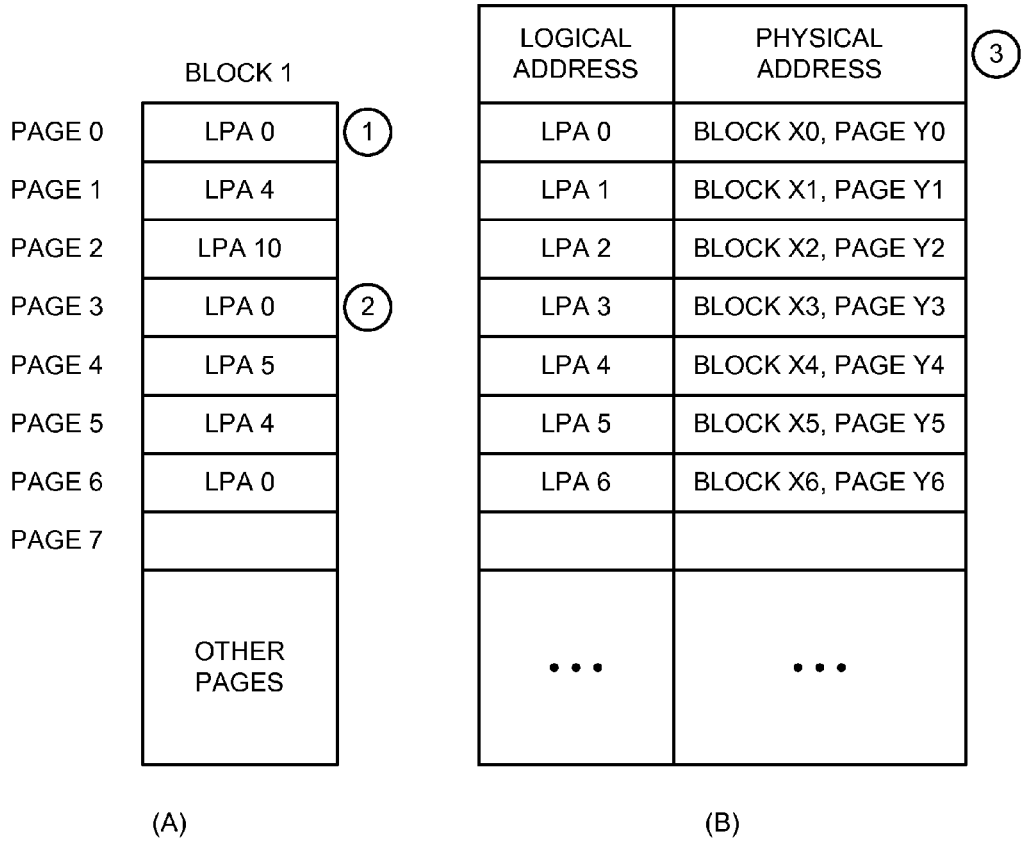
FIG. 2 is a diagram illustrating an example write operation.

Referring to FIG. 2, an example write operation is shown. In the example shown, writing an LPA 0 to page 0 is shown as a "1". A write of an LPA 4 and 10 to page 1 and 2 is also shown. If the host 82 requests another write to LPA 0, the controller 82 needs to write to other pages, for example, to page 3, shown as "2". In such an example, the LPA 0 is stored in page 3. The next time the host 82 reads LPA 0, the firmware 102 should read from page 3, not page 0. In this case, LPA data contained in page 0 is called garbage, because the newest data is stored in page 3. After the host 82 implements many data write operations to the media 86, many of the LPA will be rewritten, each time to a different location. The firmware 102 keeps track of the newest location, and then the controller 84 contains a "System MAP" to record this reflection, as "3" shows.

Figure 3:
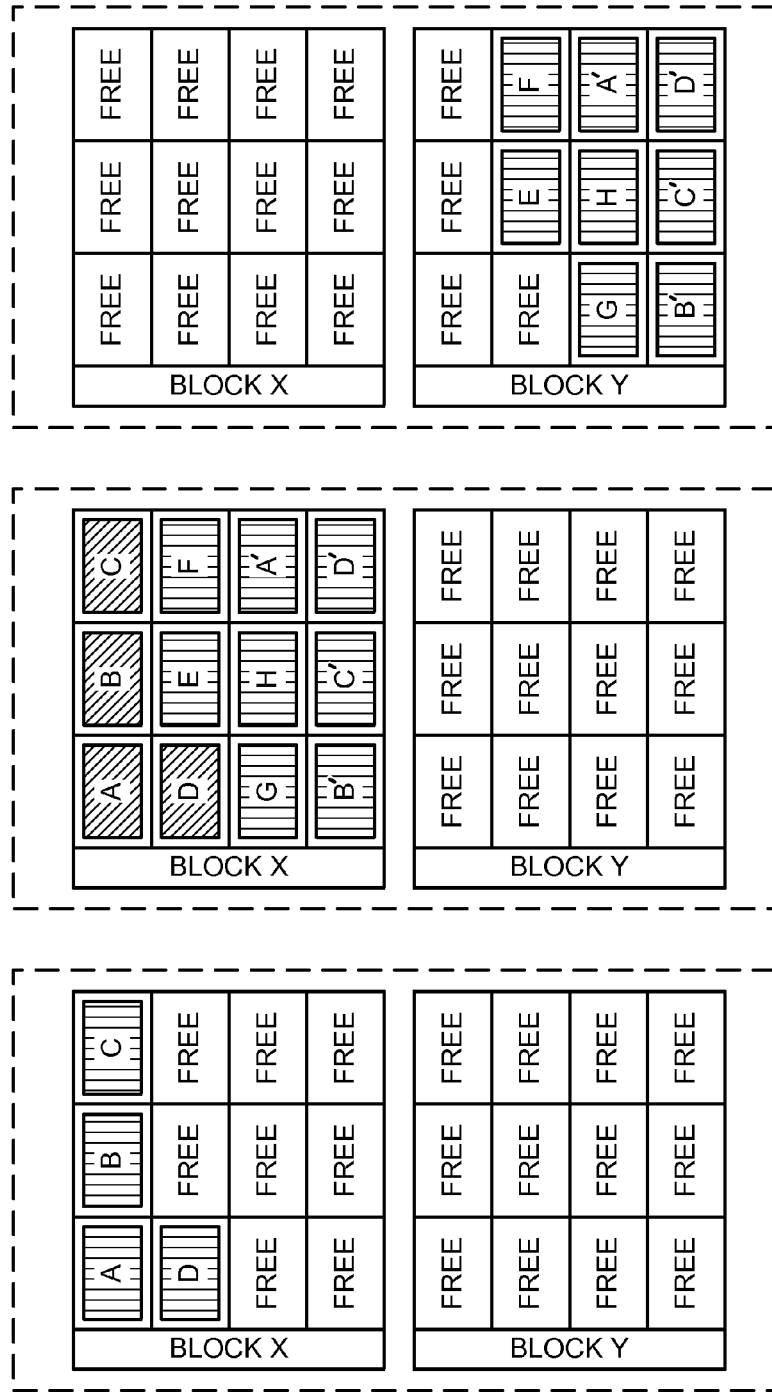
FIG. 3 is a diagram of a flash memory structure.

Referring to FIG. 3, a diagram of an organization of the memory 86 is shown. Data is written to the memory 86 in units called pages (made up of multiple cells). The memory 86 is erased in larger units called blocks (made up of multiple pages). If the data in some of the pages of the block are no longer needed (also called stale pages), only the pages with valid data in that block are read and re-written into another previously erased empty block. The free pages left by not moving the stale data are then available for storing new data. In the example shown, four pages (A-D) are written to a block (X). Individual pages may be written at any time if they are currently free (erased). Four new pages (E-H) and four replacement pages (A'-D') are written to the block (X). The original A-D pages are now invalid (stale) data, but cannot be overwritten until the block is cleared. In order to write new data to the pages with stale data (e.g., (A-D)), all of the valid pages (e.g., E-H and A'-D') are read and written to a new block (e.g., Y), then the old block (e.g., X) is erased. This last step is garbage collection.

The firmware 102 presents a physical-to-logical address map to speed up the recycle process. The recycle process includes writing the physical-to-logical address map of each block. In one example, the physical-to-logical address map contains all information to determine whether the block contains garbage data. The physical-to-logical address map is a special table that contains "physical address" to "logical page address" mapping. The following TABLE 1 illustrates such an example:

TABLE 1

| Physical Address | Logical Address |
|---|---|
| Page 0 | LPA 30 |
| Page 1 | LPA 18 |
| Page 2 | LPA 22 |
| Page 3 | LPA 7 |
| Page 4 | LPA 9 |
| Page 5 | LPA 21 |
| Page 6 | LPA 22 |
| ... | ... |

In the example shown, each block contains a physical-to-logical address map. The maps record all the LPAs of all pages (e.g., one block contains 256 pages). The last page will contain a physical-to-logical address map. In one example, the map will have 255 entries, according to 255 pages in this block, with each entry containing an LPA of that page. However, the particular number of entries may be varied (e.g., increased or decreased) to meet the design criteria of a particular implementation.

Figure 4:
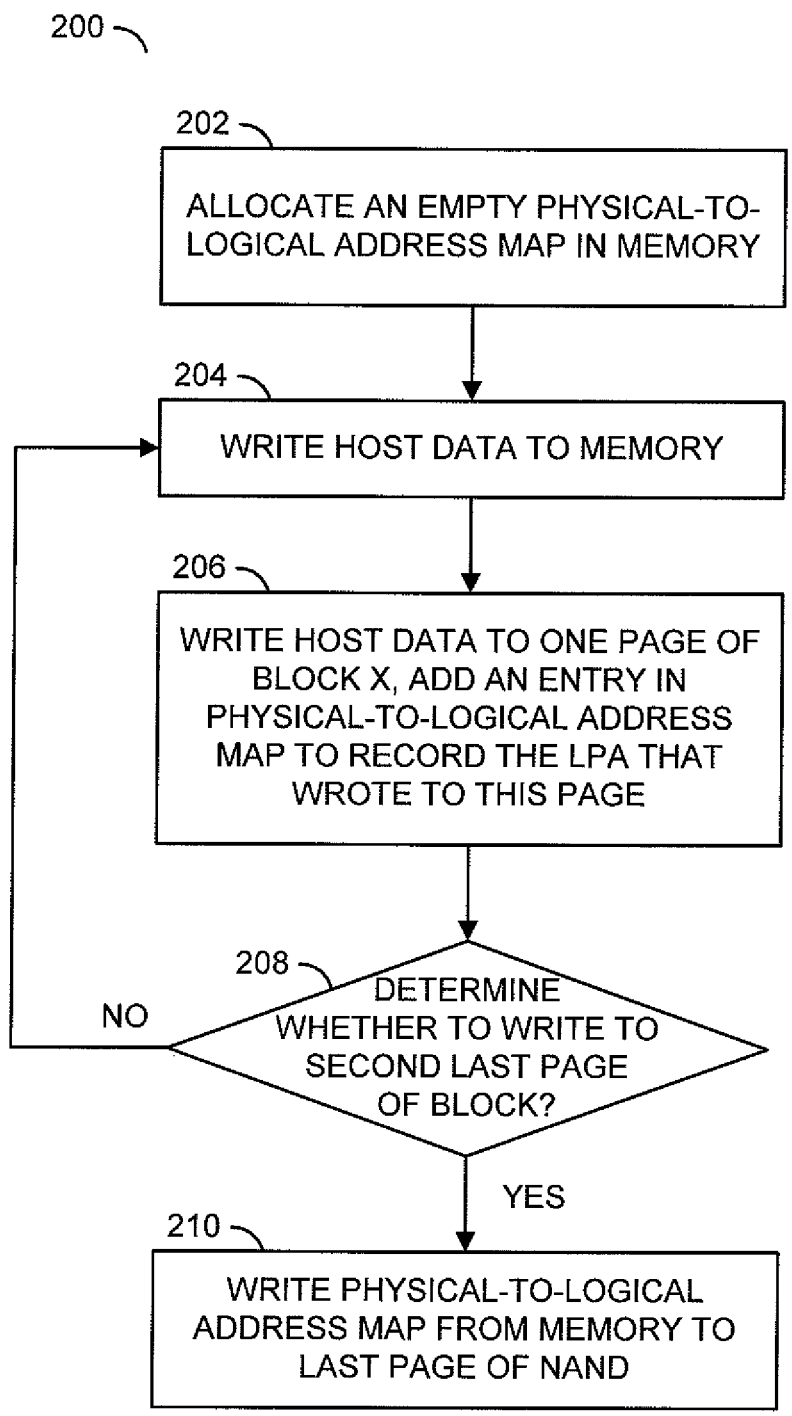
FIG. 4 is a flow diagram of a recycle operation.

Referring to FIG. 4, a method 200 is shown. The method 200 may be used to create the physical-to-logical address map of TABLE 1. The method 200 generally comprises a step (or state) 202, a step (or state) 204, a step (or state) 206, a step (or state) 208, and a step (or state) 210. The step 202 may allocate an empty physical-to-logical address map in memory. The step 204 may write host data to the memory 86. The step 206 may write host data to one page of the block X and add an entry to the physical-to-logical address map to record the LPA that writes to this page. The step 208 determines whether the controller 84 needs to write to the second to last page of the block. The step 210 writes a physical-to-logical address map from a memory.

When data is written to one block, an empty physical-to-logical address map is created in the memory 100. When data is written to one page of the block, one entry is added in the physical-to-logical address map with the physical page address written and the logical page address of the data stored. When writing to the second to the last page of the block, the whole physical-to-logical address map table is written to the last page of the block.

Figure 5:
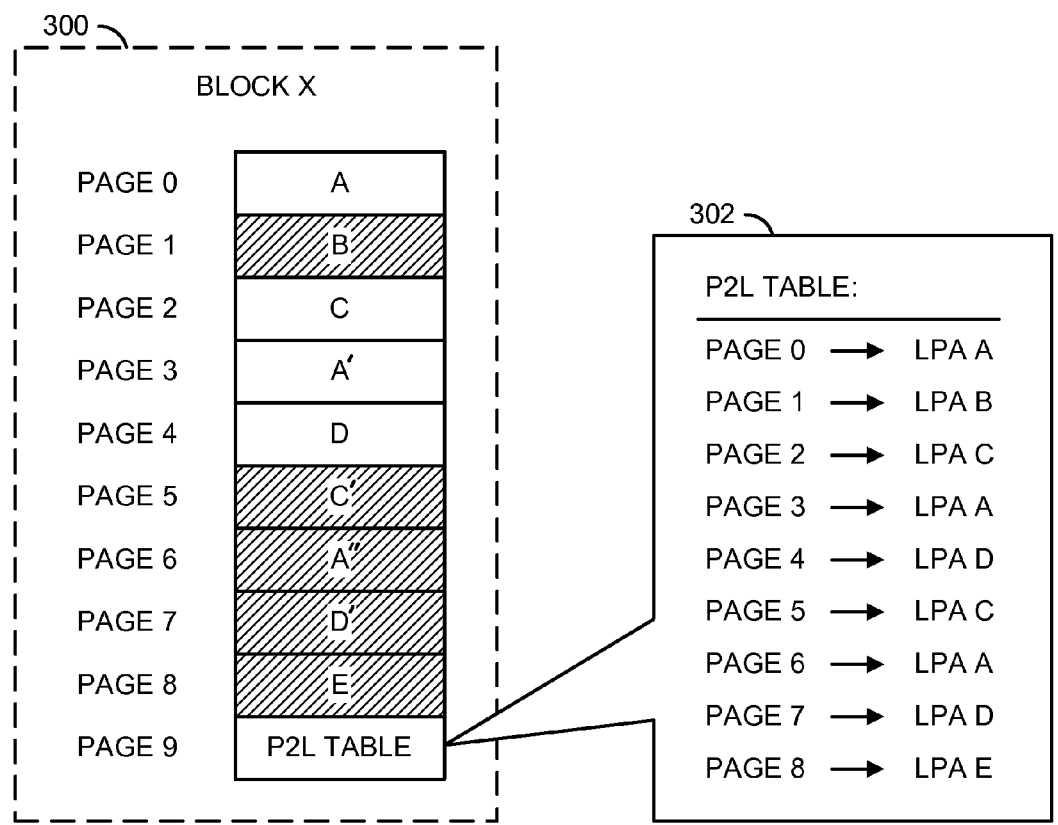
FIG. 5 is a diagram illustrating an example of a physical-to-logical address map.

Referring to FIG. 5, an example of a block 300 and a physical-to-logical address map table 302 is shown. In the example shown, the block 300 may contain 9 pages. However, the particular number of pages may be varied to meet the design criteria of a particular implementation. When a write is initiated by the host 80, data is only written to the first 8 pages. The last page (e.g., page 9) does not write user data, but rather writes all the table 302 with logical address of user data that had been written to the previous pages (e.g., the previous 8 pages). The last page of the block (e.g., page 9) then becomes a physical-to-logical address map page. For example, the page contains all the physical address of the block 300 and the logical address of corresponding user data.

Figure 6:
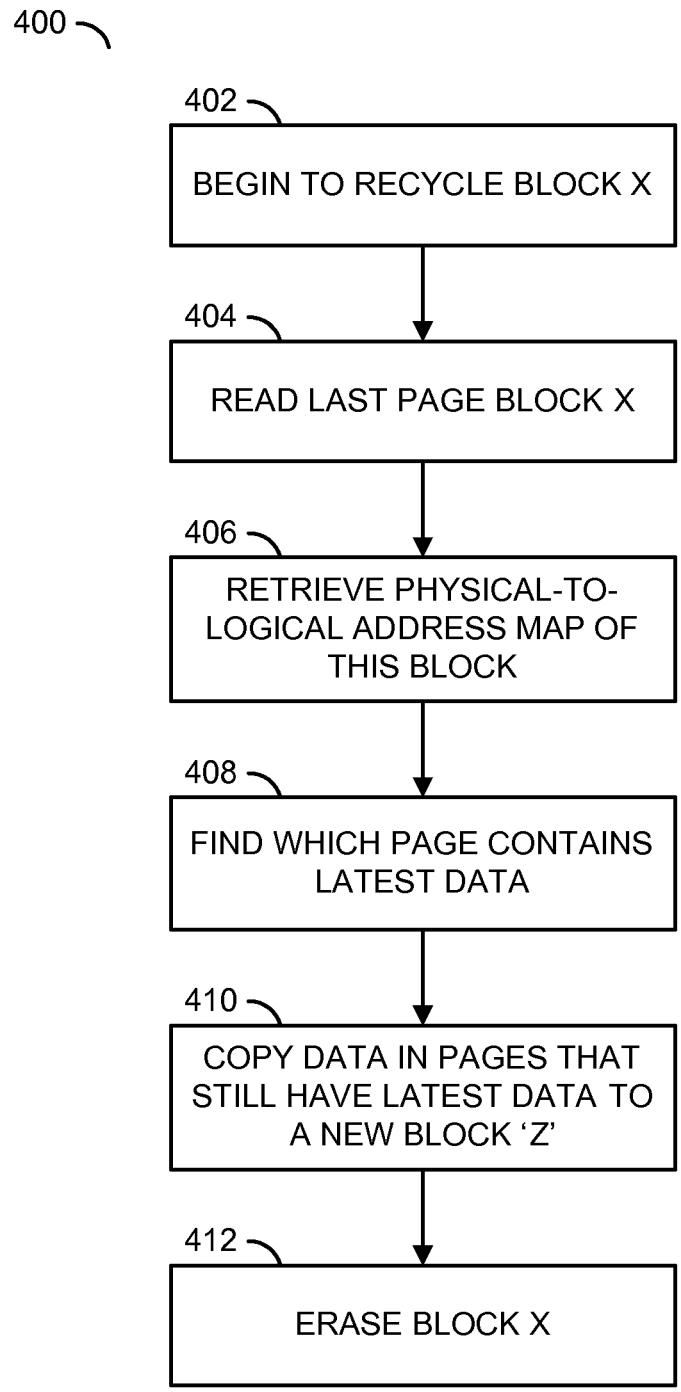
FIG. 6 is a diagram of a process implementing a recycle operation.

Referring to FIG. 6, a flow diagram of a process for using the physical-to-logical address map 302 to implement a recycle operation is shown. To recycle one block (e.g., the block 300), all of the pages of the recycled block 300 do not need to be read. The last page of the block X (e.g., 300) would be read. All of the logical address information of the pages in the recycled block are retrieved from the table 302. The logical address information in the map 302 is used to look up the physical page address to decide whether the page contains the latest data. All of the valid pages are read. The data in the valid pages is then moved to another block. After the move operation, there is no valid data left in the block that intends to be recycled. The block X is erased, then put into a pool of free blocks for subsequent use.

In general, with the process 400, only one page needs to be read. All the logical addresses of data in the recycled block are made available, which saves time. In the example of a typical 25 nm process NAND, one page is typically 8 KB, and one block contains 256 pages. The maximum time to read a page is 75 us. To transfer 8 KB of data out needs around 40 us. Typically, reading one page of data and transferring data out needs 100 us. In a common recycle example, the first step involves reading 255 pages out, which may need 255*100 us=25 ms. With the controller 84, only one page needs to be read out to recycle the whole block, which takes around 100 us. The controller 84 saves around 99.6% compared with conventional approaches.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. A method for increasing performance of a recycle operation in a solid state drive, comprising the steps of:
   (A) creating an empty physical-to-logical address map in a memory having a plurality of entry locations;
   (B) filling one of the plurality of entry locations of the address map in response to each host data write operation with a physical page address associated with each host data write operation to one of a plurality of blocks of a nonvolatile memory, wherein each block has a plurality of pages;
   (C) copying the physical-to-logical address map to a last of the plurality of pages in a particular block in response to a host data write operation to a second to last page of the particular block; and
   (D) initiating a recycle operation of each block by reading the address map stored in the last of the plurality of pages of each block to determine whether the pages of the block contain valid data.

2. The method according to claim 1, further comprising the step of:
   determining all logical addresses of a block containing valid data.

3. The method according to claim 2, further comprising the step of:
   moving host data from pages determined to contain valid data to a second block.

4. The method according to claim 1, further comprising:
   adding a block to a pool of available blocks.

5. The method according to claim 1, wherein the solid state drive comprises a plurality of NAND flash modules.

6. The method according to claim 5, wherein the NAND flash modules are removable.

7. The method according to claim 1, wherein the method is implemented in firmware stored on a controller.

8. The method according to claim 7, wherein the controller comprises a solid state drive controller.

9. The method according to claim 1, wherein the solid state drive stores data that is accessible by a host device.

10. The method according to claim 1, wherein (i) only host data is written to a portion of the plurality of pages of each block, ranging from a first page to the second to last page of each block and (ii) only the physical-to-logical address map is copied to the last of the plurality of pages of each block.

11. The method according to claim 10, wherein the last of the plurality of pages of each block becomes a physical-to-logical address map page.

12. The method according to claim 1, wherein the nonvolatile memory comprises a plurality of NAND flash modules.

13. The method according to claim 1, wherein the memory is an internal random access memory (RAM).

14. The method according to claim 1, wherein the the address map read for the recycle operation of the particular block is retrieved by reading only one page of the particular block.

15. An apparatus comprising:
   an interface configured to process a plurality of read/write operations to/from a nonvolatile memory circuit comprised of plurality of blocks having a plurality of pages;
   a memory configured to store a physical-to-logical address map having a plurality of entry locations; and
   a control circuit configured to (i) fill one of the plurality of entry locations of the address map in response to each host data write operation with a physical page address associated with each host data write operation to one of the blocks of the nonvolatile memory circuit, (ii) copy the physical-to-logical address map to a last of the plurality of pages in a particular block in response to a host data write operation to a second to last page of the particular block and (iii) initiate a recycle operation of each block by reading the address map stored in the last of the plurality of pages of each block to determine whether the pages of each block contain valid data.

16. An apparatus, comprising:
   a memory configured to store a physical-to-logical address map having a plurality of entry locations; and
   a controller configured to (i) fill one of the plurality of entry locations of the address map in response to each host data write operation with a physical page address associated with each host data write operation to one of a plurality of blocks of a nonvolatile memory, wherein each block has a plurality of pages, (ii) copy the physical-to-logical address map to a last of the plurality of pages in a particular block in response to a host data write operation to a second to last page of the particular block and (iii) initiate a recycle operation of each block by reading the address map stored in the last of the plurality of the pages of each block to determine whether the pages of each block contain valid data.

17. The apparatus according to claim 16, wherein the controller is further configured to determine all logical addresses of a block containing valid data.

18. The apparatus according to claim 16, wherein the controller is further configured to move host data from pages determined to contain valid data to a second block.

19. The apparatus according to claim 16, wherein the controller is further configured to add a block to a pool of available blocks.

20. The apparatus according to claim 16, wherein the apparatus is implemented as a solid state drive.

* * * * *